Dec. 29, 1931.  W. B. STOUT  1,838,334
AIRPLANE
Original Filed July 11, 1925  4 Sheets-Sheet 1
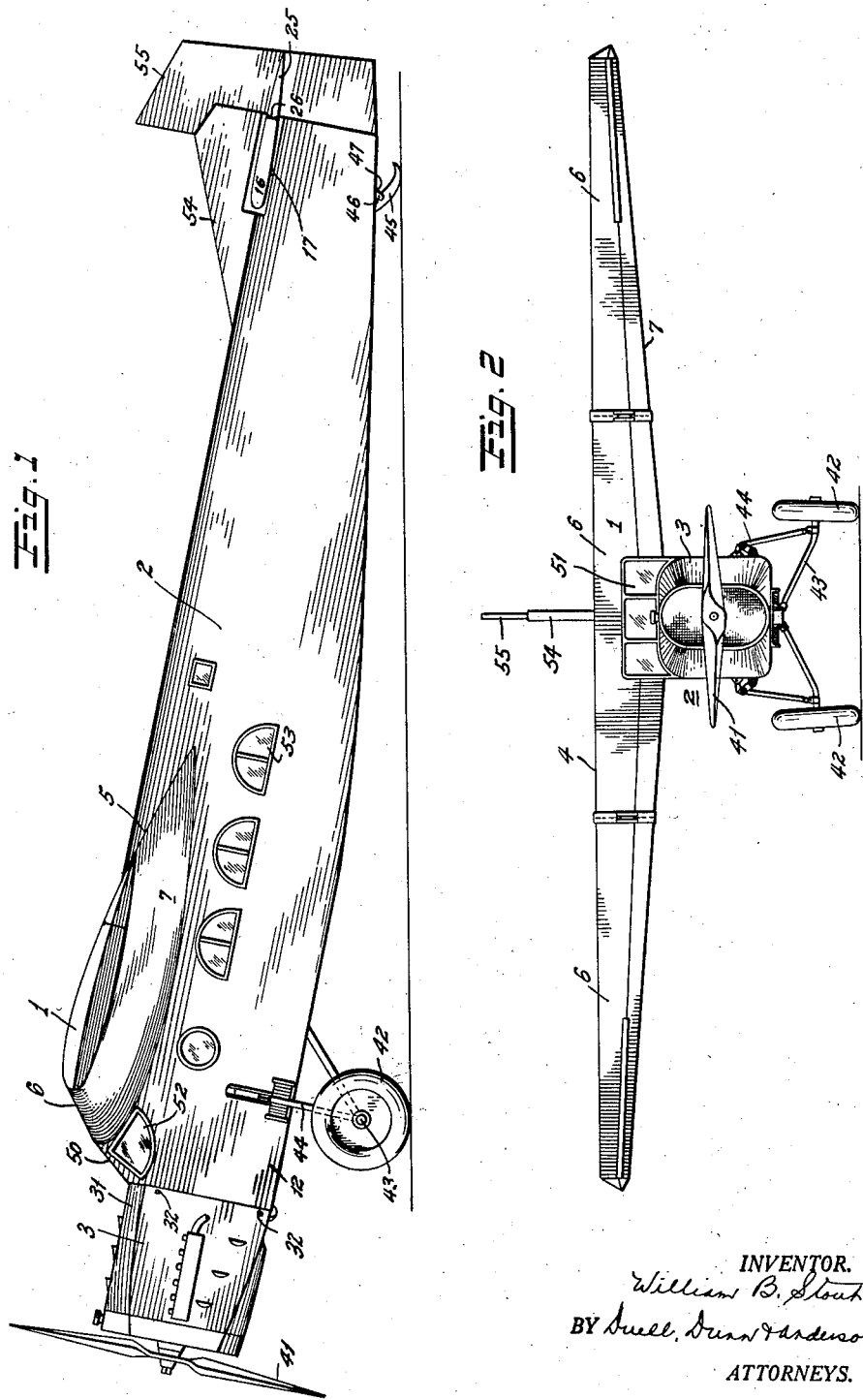
INVENTOR.
William B. Stout
BY Buell, Dunn & Anderson
ATTORNEYS.

Dec. 29, 1931.  W. B. STOUT  1,838,334
AIRPLANE
Original Filed July 11, 1925  4 Sheets-Sheet 2
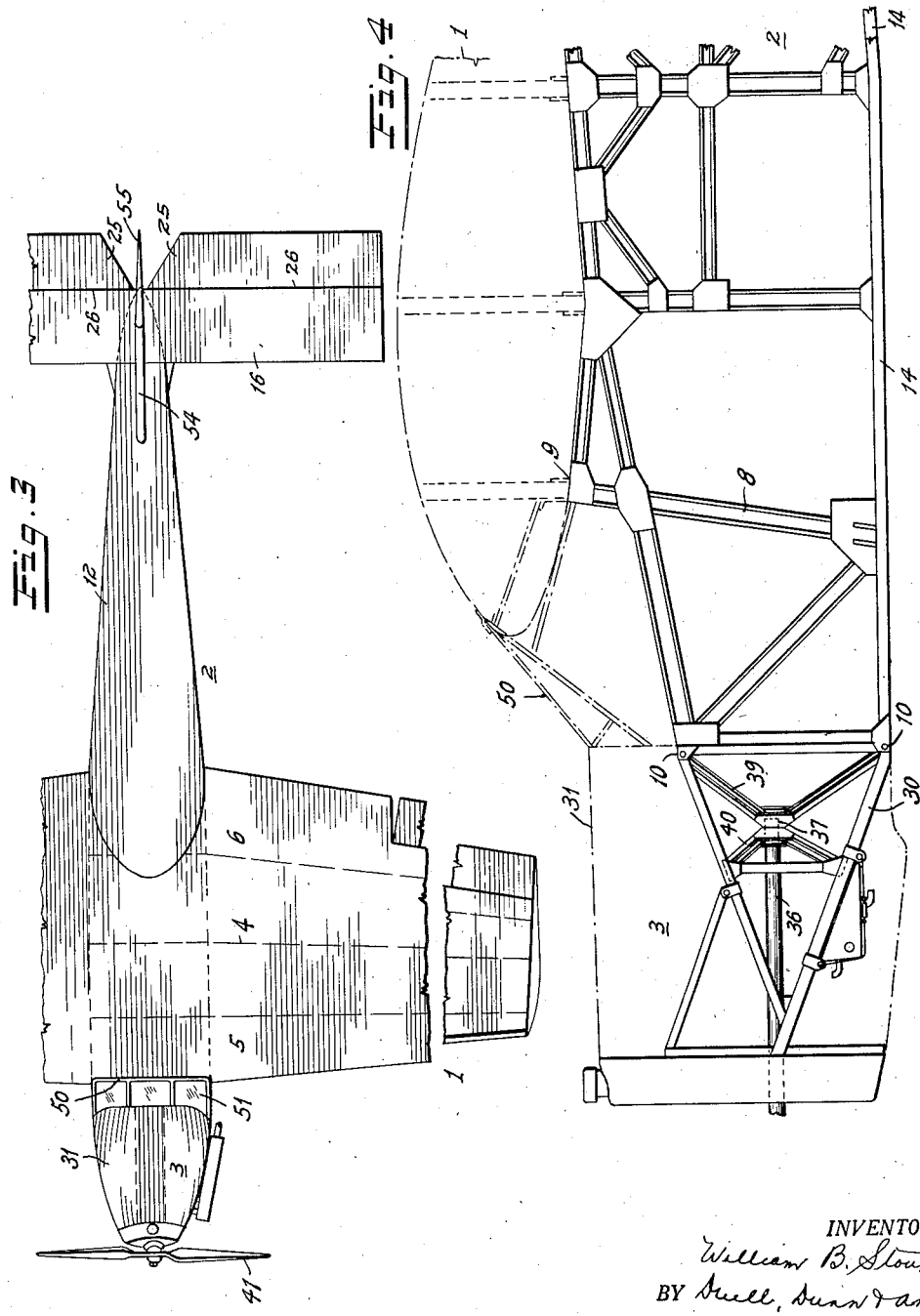
INVENTOR.
William B. Stout
BY Duell, Dunn & Anderson
ATTORNEYS.

Dec. 29, 1931.   W. B. STOUT   1,838,334
AIRPLANE
Original Filed July 11, 1925   4 Sheets-Sheet 3
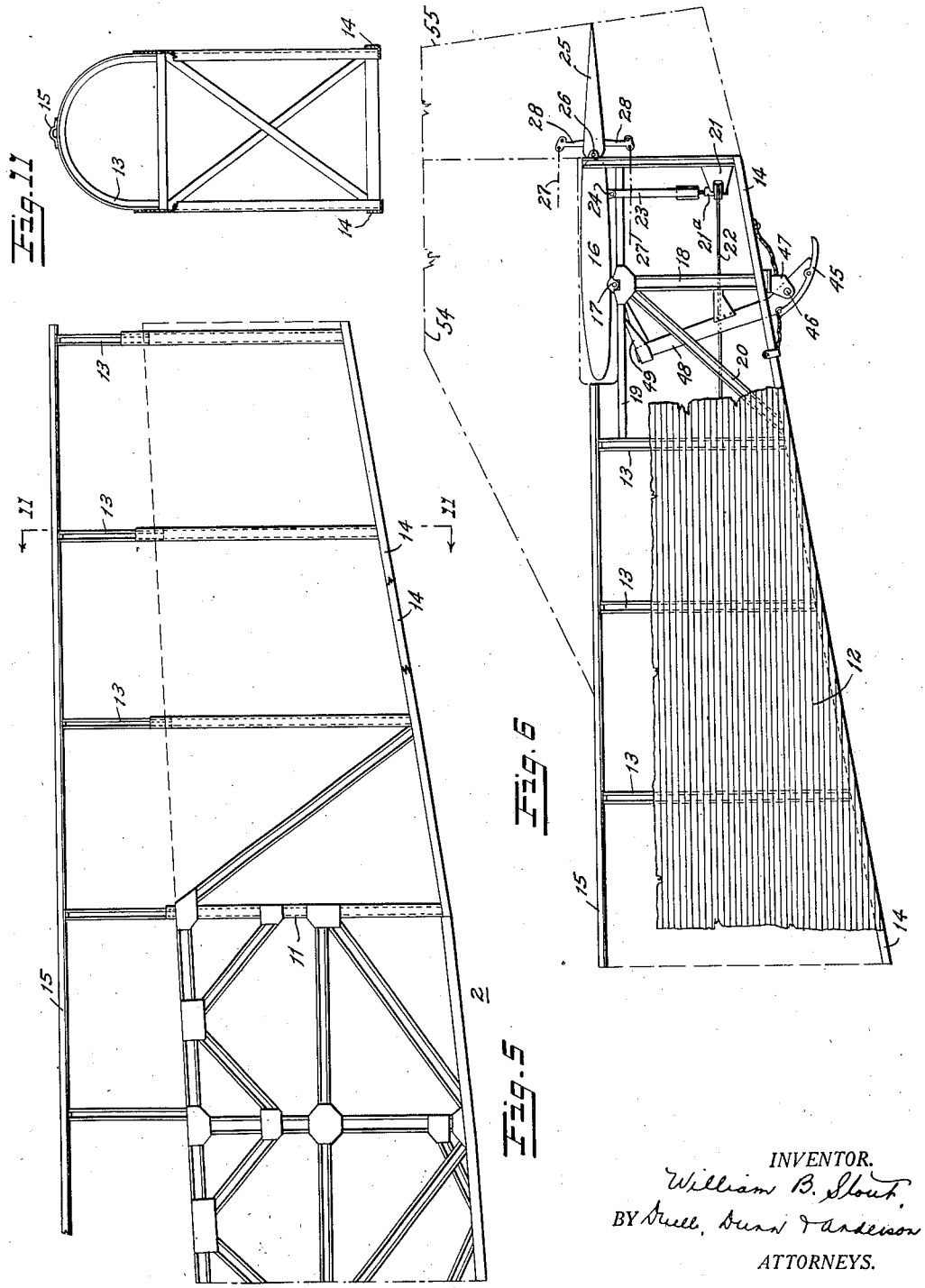
INVENTOR.
William B. Stout
BY Duell, Dunn & Anderson
ATTORNEYS.

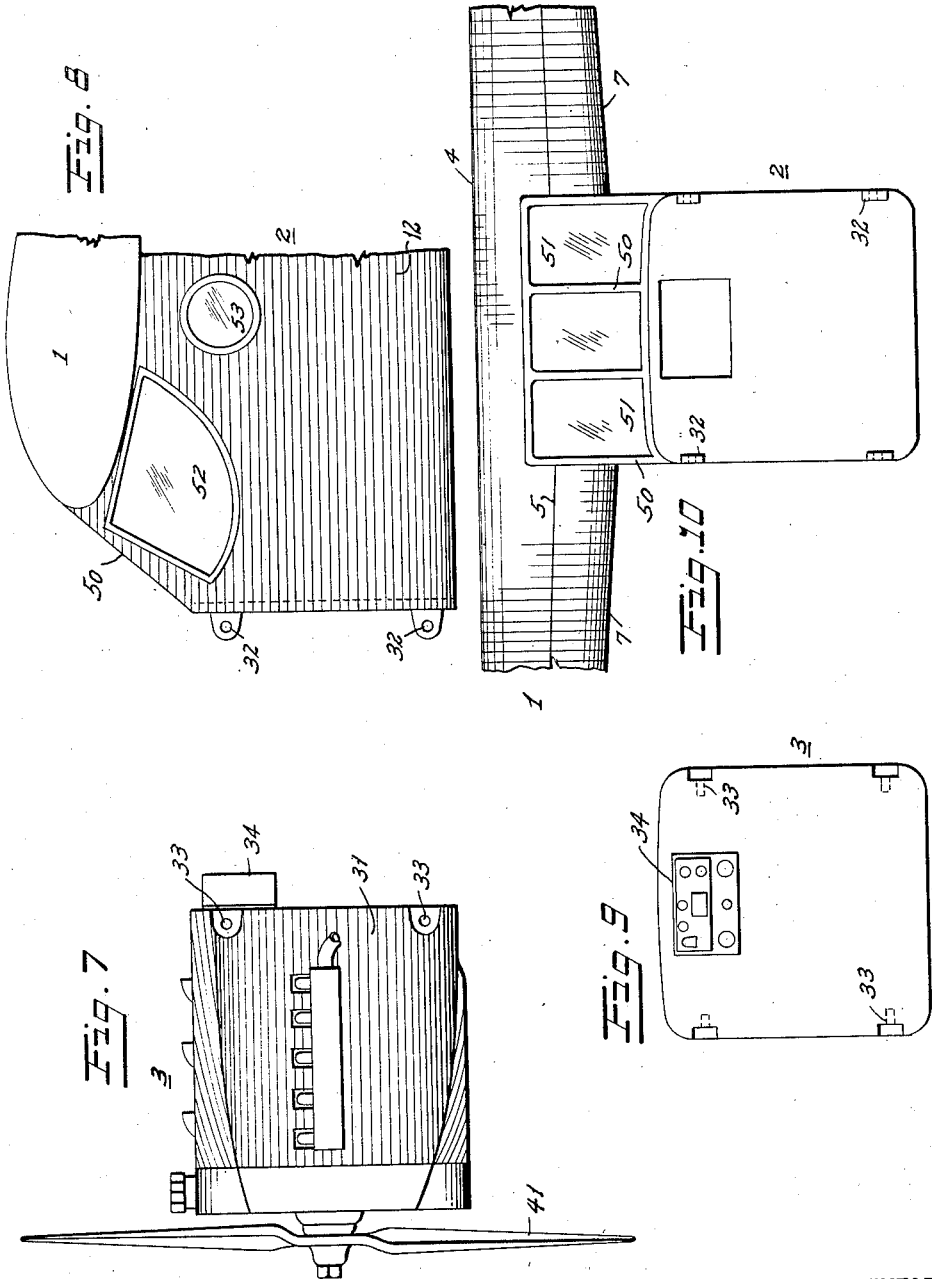

Patented Dec. 29, 1931

1,838,334

UNITED STATES PATENT OFFICE

WILLIAM B. STOUT, OF DETROIT, MICHIGAN, ASSIGNOR TO FORD MOTOR COMPANY, OF HIGHLAND PARK, MICHIGAN

AIRPLANE

Original application filed July 11, 1925, Serial No. 42,944. Divided and this application filed July 16, 1926. Serial No. 122,758.

This invention relates to airplanes, and more particularly to the construction of the fuselage. This application is a division of my co-pending application Serial No. 42,944, filed July 11, 1925.

In the construction of airplanes heretofore, it has been customary to construct the various elements of the plane as light as possible and to afford the necessary support and rigidity by external bracing. Such external bracing has been the cause of a great deal of parasite resistance.

In accordance with my invention it has been found that the elements of the plane may to advantage be made of such size and construction as to be self-supporting within themselves so that external bracing is not required. Such an airplane is shown in my copending application aforesaid.

The present application is directed more particularly to the construction of the fuselage, and the assembling of the fuselage with the wing structure, whereby the elements individually are of sufficient strength in themselves to withstand the incident strains, and whereby they may be assembled with ease, and whereby the necessary useful support is afforded with the minimum of dead weight, and a minimum of drag.

Airplanes have, moreover, heretofore been fabricated as a unit, the parts being cross braced to each other, and dependent upon such cross bracing for their operative strength. This procedure necessarily requires hand construction, making quantity production impossible.

It has been found, particularly with the monoplane type of machine, that the forward part of the fuselage directly beneath the wing section, which part connects the wing, the load carrying body, and the propeller, requires materially greater strength than the rear portions of the fuselage which are subjected to the strains incident only to the control by the empennage. In such a case the thickness of the exterior covering of the fuselage is determined by factors other than its weight supporting capacity. It has been found desirable to employ metal for this purpose, and this metal when of the most desirable thickness from the point of view of resisting denting and similar distortions, is wholly inadequate to support the strains incident to the transmission of the forces interoperating between the propeller and the load and the wing but such shell strength is sufficient to form with certain interior supports a truss having ample strength between the wing and the empennage.

It is an object of this invention to provide an airplane in which the different elements of the plane may be separately self-assembled into complete operating structural units each of which is self-supporting, and in which the parts may be quickly and rapidly assembled into the completed machine.

It is a further object to provide structural frameworks for the wing and for the fuselage, sufficient, each separately, in itself to withstand all of the lifting and propelling strains referred to, to enclose such framework completely in an outer covering capable of forming a unitary stream line effect.

It is a further object to construct a fuselage body in which the main stresses are carried by interior framework designed to be of ample strength to withstand the strains above referred to, but having a posterior portion, in which the covering is utilized as a part of the supporting structure.

Other objects of the invention will in part be obvious and will in part appear hereinafter.

The invention accordingly comprises the features of construction, combinations of elements and arrangements of parts, which will be exemplified in the construction hereinafter set forth and the scope of the application of which will be indicated in the claims.

For a fuller understanding of the nature and objects of the invention reference should be had to the following detailed description taken in connection with the accompanying drawings, in which:

Fig. 1 is a side elevation of a plane made in accordance with this invention;

Fig. 2 is a front elevation thereof;

Fig. 3 is a top plan view parts being broken away;

Figs. 4, 5, and 6 are side elevations of the supporting interior framework of the front, central and rear portions of the fuselage respectively;

Fig. 7 is an enlarged side elevation of the power plant section of the fuselage;

Fig. 8 is a similar elevation of those portions of the fuselage body to which the power plant is to be attached;

Fig. 9 is an end view of the power plant as seen in Fig. 7, the propeller being removed;

Fig. 10 is an end view of the corresponding portion of the fuselage shown in Fig. 8.

Fig. 11 is a section on the line 11—11 of Fig. 5.

In accordance with the illustrated embodiment of this invention, the airplane is made generally in the form of three structurally distinct and separable units, comprising wings, 1, fuselage body 2, and power plant 3. The wings are generally preferably of the fat type, comprising a self-sustaining structural framework completely enclosed within the outer covering. The exact wing construction forms no part of this application. It is fully described in the said co-pending application and need not be further described in this application, save to state that the wing structure is conveniently a complete structural unit continuous from tip to tip.

The wings are preferably convex in both upper and lower surface, as will be more clearly shown in Fig. 1. The topmost line 4 of the wing is preferably a straight line from tip to tip but the incident and trailing edges 5 and 6 each preferably slants toward the other, and the lower surface 7 slants upwardly from the fuselage body to the extremity of the wing, all of which will be clear from Figs. 1, 2 and 3. Thus the width of the wing decreases from the body toward the tip and the two halves of the wing on opposite sides of the fuselage present a dihedral angle to each other to effect stability.

The body portion 2 together with the power plant 3 forms the fuselage and comprises an interior framework 8 having at 9 members for attachment to the framework of the wing and having at 10 members for the attachment to the framework of the power plant section 3 as will be later described. The framework 8 extends from the point 10 rearwardly beneath the wing supports 9 to a position back of the wings as shown at 11, thus furnishing a firm and rigid connection between the wings, the power plant and the load supporting sections of the fuselage.

The fuselage body is covered as shown at 12, preferably by a corrugated form of a suitable light metal, such as an aluminum alloy. At the rear of the fuselage body a suitable framework is provided for supporting the stabilizer, elevator and rudder.

The portion of the fuselage which lies between the forward framework 8 and the empennage supporting framework, is preferably braced by a series of circumferential braces 13, attached to and co-operating with the covering to form a supporting truss to resist the strains incident to the control of the plane by the empennage. A plurality of longérons preferably extend from the front of the plane to the rear, to assist in maintaining the rigidity of the fuselage. As illustrated, two such longérons 14 are provided, one at each side of the bottom of the fuselage, and another, 15, centrally disposed at the top. These three furnish a connecting means between the forward and rear frameworks, and assist in maintaining the circumferential bracing members 13 in place.

The stabilizer comprises, as is customary, an airfoil of materially less size than the supporting airfoils, as shown at 16. It is pivoted, as at 17, to the empennage framework. An upright 18 is provided for such mounting of the stabilizer and this upright is supported laterally at its top by braces 19, and diagonally by a brace 20. Suitable mechanism is provided for rocking the stabilizer 16 about the pivot 17, in order to adjust its angle of incidence to different flight conditions. As illustrated, there is provided upon the empennage framework a bracket 21, carrying a rotatable nut 21$^a$ operated by a cable 22 within the control of the pilot. A link 23 is povoted, as at one end, to the stabilizer, as shown at 24, while its opposite end screws into the nut 21$^a$, whereby, on rotation of the nut, the link 23 is raised or lowered to operate the stabilizer.

The elevator 25 is shaped to form an aerodynamic unit with the stabilizer, and it is pivoted, as at 26, to the rear edge of the stabilizer, so that, in effect, the stabilizer and elevator constitute a single airfoil of varying camber. The elevator is controlled by cables 27, connected to arms 28. The cables 27, however, are arranged to have their line of action include the axis of the pivot 17, so that the camber of the airfoil, comprising the stabilizer and elevator combined, is not altered by changing its angle of incidence, since the relation of the elevator to the stabilizer is independent of such elevation.

The power plant section comprises, in general, a framework 30 adapted to be bolted to the framework 8, at 10, as previously described, which framework is adapted to support an internal combustion engine and the cooling system and the propeller, although it will be obvious that the type of engine and cooling system are not material portions of this invention. The power plant section of the airplane is also if desired covered by corrugated metal, as shown at 31, which is of such size and shape as to merge into the covering of the fuselage body unit and aerodynamic unit, as will be clearly seen from Figs. 1 and 2.

As illustrated, the power plant section is attached to the body section by means of ears 32, which are formed with openings to be aligned with bolt holes 33 in the power plant section and adapted to receive suitable retaining bolts.

The rear side of the power plant section is provided with an instrument board, as shown in Fig. 9 at 34, carrying the instruments relative to the functioning of the power plant, while the front face of the body section is provided with a corresponding orifice through which the said instrument board is adapted to project into the pilot compartment. With this instrument board, it will be clear that the power plant may be assembled and tested with its own instruments before being attached to the airplane, and may then be so attached without readjustment. Furthermore, should occasion arise for removing the power plane for repairs, a new one may be substituted which has already been adjusted, and the plane may proceed practically without interruption.

The power plant framework includes a main power shaft 36, having a thrust bearing at 37 thoroughly braced to the power plant framework, as shown at 39 and 40. This shaft 36 carries at its outer end the propeller 41, and it is connected in any suitable and customary manner with the engine, which, for clarity of illustration, in view of the fact that it forms no part of the present invention, has not been shown.

The landing gear comprises, in general, a pair of wheels 42, carried on a supporting framework 43, and capable of being retracted as at 44. This mechanism is more fully described in said parent application, and need not be here further described in view of the fact that it forms no part of the present invention.

The tail-skid is illustrated as comprising a member 45, pivoted, as at 46, to a bracket 47 attached to the empennage framework. This member 45 carries an arm 48 which is resiliently held to the framework by a suitable elastic band 49, to take up the shock incident to landing.

By the above construction, it will be seen that the fuselage body comprises, in general, a considerable pilot and passenger space, which may, of course, be provided with any suitable windows. The front of the pilot compartment is preferably in the form of an upwardly and rearwardly inclined surface 50, which merges at the lower front end with the top of the power compartment covering, and which merges at the upper rear end with the wing. This surface 50 is provided with a plurality of windows, as shown at 51, while the lateral windows are illustrated at 52 and 53. For the purpose of lateral control a suitable lateral stablizer 54 and rudder 55 may be provided.

Since certain changes may be made in the above construction and different embodiments of the invention could be made without departing from the scope thereof, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described my invention, what I claim as new and desire to secure by Letters Patent, is:

1. In an airplane, a fuselage comprising a framework and a covering, an engine compartment comprising an engine supporting frame, a covering for the side of said fuselage, and a covering for the sides and end of said engine compartment, means for attaching said engine compartment to said fuselage to cause said end covering of said engine compartment to close the end of said fuselage, said end covering constituting an instrument board visible from the interior of said fuselage when said parts are so assembled.

2. In an airplane, a fuselage comprising a framework and a covering, an engine compartment comprising an engine supporting frame, an exterior covering therefor, an end covering carrying an instrument board and forming a part of said compartment and means for removably securing said engine compartment to said fuselage.

3. In an airplane comprising a passenger carrying section, and another section adapted to be connected thereto, said passenger section having an opening, and said other section having an instrument board adapted to extend into and close said opening, when said parts are assembled.

4. In an airplane, in combination, a fuselage having a pilot compartment in the front end thereof, a partition in the front end of said compartment, an aperture in said partition, a unitary engine compartment removably secured to the fuselage, said engine compartment comprising a rear wall and engine controlling instruments mounted on said rear wall and adapted to project through said aperture into the pilot compartment.

5. In an airplane, in combination, a fuselage having a pilot compartment in the front end thereof, a partition wall in the front of the pilot compartment adapted to carry airplane performance indicating instruments, an aperture in said partition, an engine compartment comprising an instrument panel adapted to fit in said aperture, bringing the engine instruments therein adjacent to the plane instruments on said partition.

6. An aircraft fuselage including a body section and a power section and means for coupling said sections to each other, such power section comprising a framework including inwardly inclined bracing members extending to a common point, a thrust bearing at the point of juncture of said bracing members and a power shaft supported in said thrust bearing.

In testimony whereof I affix my signature.
WILLIAM B. STOUT.